United States Patent Office 2,950,634
Patented Aug. 30, 1960

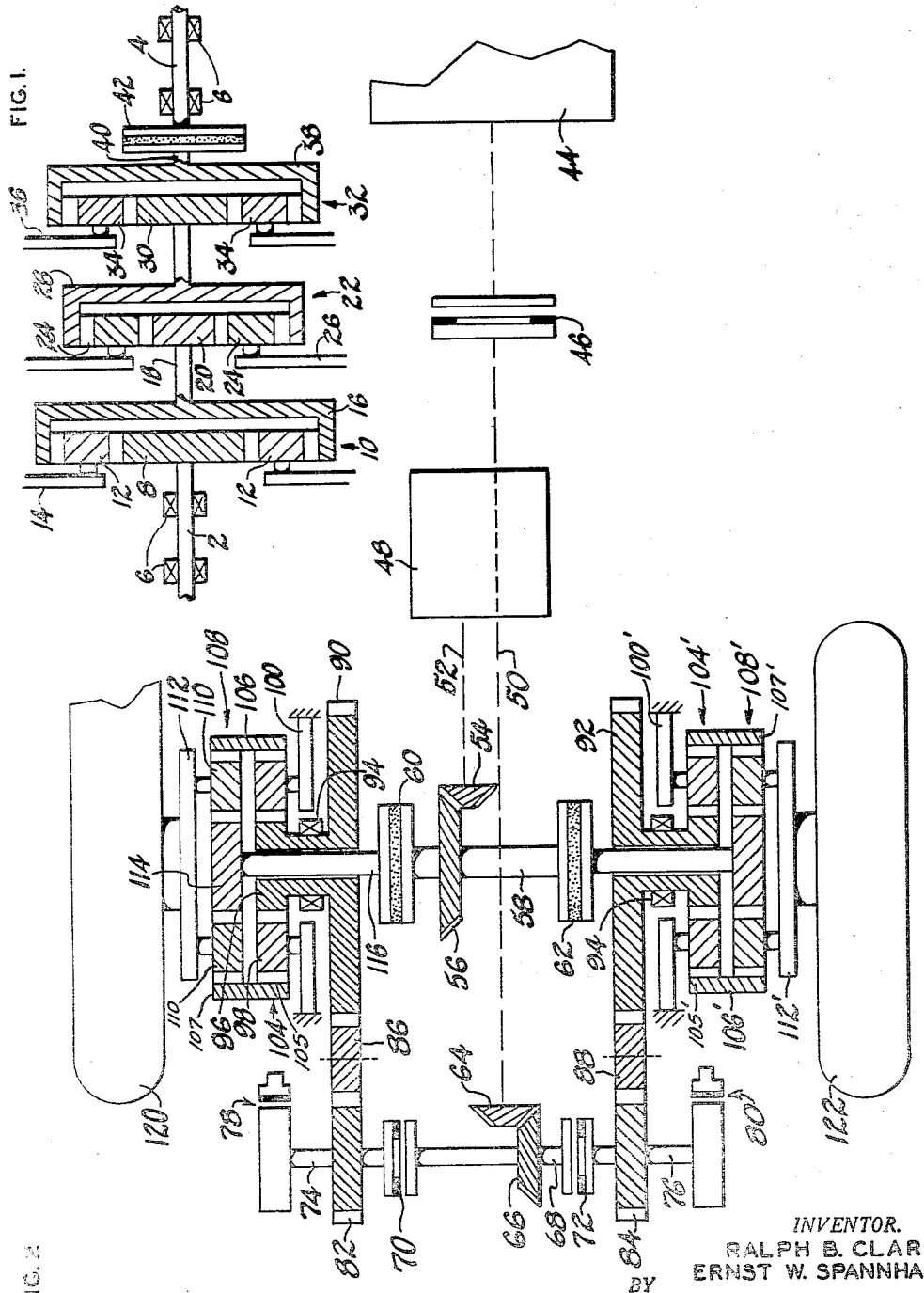

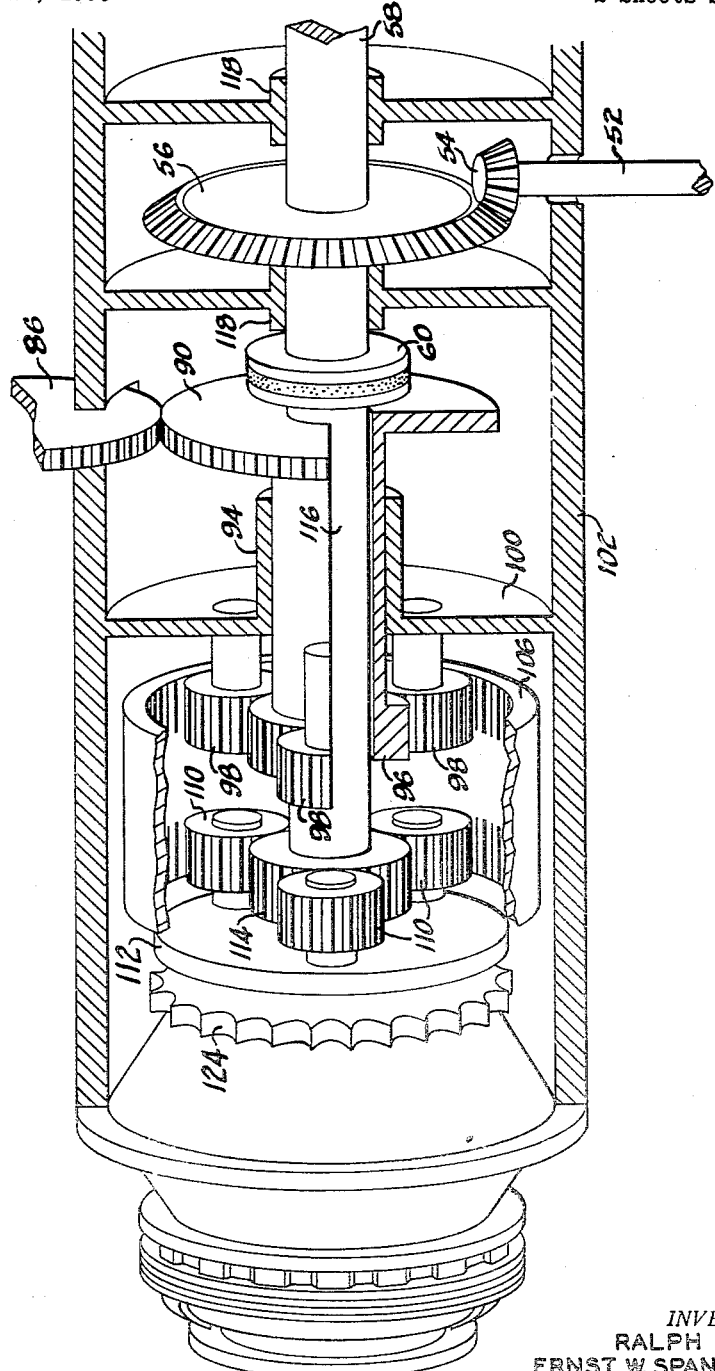

2,950,634

POWER TRAIN

Ralph B. Clark, Morton, and Ernst W. Spannhake, Peoria, Ill., assignors to LeTourneau-Westinghouse Company, Peoria, Ill., a corporation of Illinois Filed Jan. 24, 1956, Ser. No. 560,964

4 Claims. (Cl. 74—801)

This invention relates to a power train, and especially to a power train for vehicles which are steered by means of the power train.

It is well known in the art of gear trains that it is possible to float one of the members of a conjugate set of planetary gears if the other one is fixed radially. It is one object of this invention to provide a plurality of planetary gear sets connected in series in such a way that the floated gear of one set is used to locate or fix radially a conjugate gear of the next adjacent planetary train, thereby making the other conjugate gear of the second train floatable.

This invention is applicable to automotive vehicles of the type in which steering is accomplished by slowing down the ground engaging member on one side of the vehicle while maintaining speed of the ground engaging member on the other side. It is accordingly another object of this invention to provide a power train of a simplified and improved design which permits steering of an automotive vehicle by changing the relative speeds of ground engaging members on opposite sides of the vehicle. It is still another object of this invention to provide a simplified and improved power train in which torque multiplication is readily accomplished without breaking the drive and without utilizing such mechanically inefficient devices as torque converters.

Although the foregoing discussion refers to planetary gear trains, it will be understood that the invention is equally applicable to a gear train in all respects similar to a planetary train but one in which the element known as a planet carrier in a true planetary train is permanently fixed against rotation, with the result that the gear which is a planetary gear in a planetary train does not orbit about the sun gear. In one application of the invention here shown and described, a compound gear train is shown, one set of the compound train being a set of planetary gears, and the other set being a gear train in which the gear between the ring gear and the sun gear does not orbit about the sun gear.

In the drawings:

Fig. 1 is a schematic showing of a power train illustrating some of the advantages of this invention;

Fig. 2 is a schematic showing of an automotive vehicle or tractor equipped with a power train embodying certain features of the power train shown in Fig. 1 and illustrating still other advantages of the invention; and Fig. 3 is a view in perspective, with parts broken away and in section to show details, of a portion of the power train shown in Fig. 2 but on a larger scale than Fig. 2.

Referring now in detail to the embodiment of the invention shown in Fig. 1, the power train there shown has two shafts 2 and 4 which are located radially by means of bearings 6. It will be understood by those skilled in the art that power may flow from shaft 2 to shaft 4 or vice versa. Shaft 2 carries a sun gear 8 of a gear set indicated generally at 10. Since sun gear 8 is securely fixed on shaft 2, gear 8 rotates on a fixed center, instead of floating. Two or more gears 12 are mounted on a carrier 14 and mesh with sun gear 8. In the embodiment shown, carrier 14 is designed to be the reaction member and will therefore be secured in any suitable manner against rotation about the axis of sun gear 8.

Gears 12 may if desired rotate about a fixed axis or may be floating—i.e., be self-centering. A ring element consisting of a ring gear 16 surrounds the gears 12 and meshes with them. Ring gear 16 is not itself directly supported in bearings. Thus it is free to find its own center; in other words, ring gear 16 floats.

With ring gear 16 free to find its own center, any rotating element supported by and rotating with the ring gear will rotate about an axis which will be located by the characteristics of the gear train 10. Thus, the floating ring gear 16 can be used to locate radially one of the elements of an adjacent gear set to which the gear train 10 is connected. In the embodiment shown in Fig. 1, ring gear 16 carries a shaft 18 to which is secured a sun gear 20. Sun gear 20 is located or fixed radially by ring gear 16 in cooperation with gears 12 and sun gear 8.

Sun gear 20 constitutes the sun element of a second gear set indicated generally at 22, gear set 22 having also an intermediate element and a ring element. The intermediate element consists of gears 24 and a carrier 26. As in the case of gear set 10, the intermediate element of gear set 22 serves as the reaction member in the embodiment shown, so that carrier 26 will be secured against rotation in any suitable manner. Also, the intermediate element consisting of gears 24 and carrier 26 may be fixed radially or may float. The ring element of gear set 22 consists of ring gear 28 and is mounted to float.

From the foregoing, it will be evident to those skilled in the art that this pattern can be repeated a number of times—in theory, indefinitely. In the embodiment shown in Fig. 1, floating ring gear 28 locates (fixes) the axis of rotation of sun gear 30 of the gear train 32. Train 32 includes an intermediate element made up of gears 34 and a carrier 36, and a ring gear 38. Ring gear 38 is connected with a shaft 40. Shaft 40 is connected with shaft 4 through a flexible coupling 42. The flexibility desired in flexible coupling 42 is such as to permit shaft 40 to be self-centering; in other words, the bearings 6 which locate or fix the axis of rotation of shaft 4 do not fix the axis of shaft 40, because of the flexible coupling 42.

Figs. 2 and 3 illustrate an application of the invention to an automotive vehicle in which a source of power 44 such as an internal combustion engine is connected with a clutch 46 which in turn delivers power to change-speed gears (transmission) 48. There are two output shafts from transmission 48, namely 50 and 52. Shaft 50 is shown schematically as passing "straight through" transmission 48, indicating no gear reduction. However, shaft 52 receives power through the change speed gears. Accordingly, the principal differences between shafts 50 and 52 are that, with clutch 46 engaged, shaft 50 runs all the time whether or not the transmission is in gear; and, for a constant engine speed, the speed of shaft 50 is constant, whereas the speed of shaft 52 depends upon the operating position in which transmission 48 is engaged.

Output shaft 52 carries a bevel pinion 54 which meshes with a bevel gear 56 on cross shaft 58. Cross shaft 58 has flexible couplings 60 and 62 at its outer ends.

Passing now to output shaft 50, a bevel pinion 64 is secured to this shaft and rotates with it. Pinion 64 meshes with a bevel gear 66 mounted on a second cross shaft 68. Cross shaft 68 has clutches 70 and 72 at its outer ends. Clutches 70 and 72 are connected with output shafts 74 and 76 which carry brakes 78 and 80 respectively.

Shafts 74 and 76 carry gears 82 and 84 which mesh with idler gears 86 and 88 respectively. Idlers 86 and 88 mesh with bull gears 90 and 92 respectively which rotate about axes fixed by suitable bearings such as those indicated at 94, bearings 94 serving of course to locate the gears 90 and 92 by means of the hubs associated with those gears. The hub of gear 90 carries a sun gear 96; sun gear 96 is thus fixed radially, and is the sun element of a gear set or train having an intermediate element consisting of gears 98 and a carrier 100. In the embodiment shown, the intermediate element is the reaction member of the gear set, and so carrier 100 is shown as being held against rotation by being secured to the axle housing 102 (Fig. 3) in any suitable manner.

The intermediate element may be designed to float, in which case the connection between carrier 100 and housing 102 would be such as to permit relative radial movement but preventing relative angular movement. Such devices are well known in the art and need not be detailed here. For the sake of simplicity in the drawings, carrier 100 is here shown as being integral with housing 102, which of course means that, in the illustrated embodiment, the intermediate element is fixed radially rather than floating.

The gear train comprising sun gear 96, gears 98, and carrier 100 may be indicated generally by 104. In addition to the elements named, train 104 also includes a ring element, or ring gear, 105 which meshes with the gears 98. A planetary gear train 108 includes a ring gear 107 which is joined with ring gear 105 by a connection 106. In actual practise, ring gears 105, 107 and connection 106 may be all one piece. Thus, planetary train 108 includes, in addition to ring gear 107, a planet element and a sun element, the planet element consisting of planet gears 110, and a planet carrier 112, and the sun element consisting of the illustrated sun gear 114.

From the discussion of the embodiment of the invention shown in Fig. 1, it will be understood that ring gear 105 is mounted in such a manner as to be free to find its own center—in other words, ring gear 105 is a floating conjugate gear—from the viewpoint of gear train 104. With the ring gear 105 of gear train 104 free to float and seek its own center or axis of rotation, the axis of rotation thus located becomes a fixed axis for the ring gear 107 of planetary gear train 108 because of the connection 106. The planet element of planetary train 108 may be fixed or floating as desired. Sun gear 114 is mounted to float and is connected to or mounted on a shaft 116 which is in turn connected with the flexible coupling 60. Inasmuch as cross shaft 58 is mounted in bearings 118 (Fig. 3), the axis of rotation of cross shaft 58 is fixed. However, flexible coupling 60 allows shaft 58 to drive shaft 116 without imposing upon shaft 116 the same axis of rotation as shaft 58.

In the embodiment shown, planet carrier 112 is connected to drive one of the drive wheels 120 of the automotive vehicle, the other drive wheel 122 being connected with the planet carrier 112'.

Inasmuch as the two gear trains associated with drive wheel 122 are identical with the trains 104 and 108, the corresponding parts of the gear trains associated with drive wheel 122 are indicated where necessary by the same reference characters, but primed to distinguish them. Thus, the gear trains associated with drive wheel 122 are indicated by 104' and 108'.

The invention shown may be applied to a two wheel vehicle or a four wheel vehicle. In the case of a four wheel vehicle, the other wheels may be chain driven from sprockets mounted adjacent drive wheels 120 and 122; one such sprocket is shown at 124 in Fig. 3.

*Operation*

Referring again to Fig. 1, with the sun element, namely, sun gear 8, of gear train 10 having a radially fixed axis of rotation (by virtue of bearings 6), ring gear 16 may be mounted to float or to find its own axis of rotation, and this is true whether the carrier element be mounted on a fixed axis or whether it be floating. With ring gear 16 free to find its own axis of rotation, the axis of rotation of sun gear 20 becomes fixed. In the connotation here used, "fixed" means simply that its axis of rotation is determined or located by the floating ring gear 16; it does not mean that the axis has a fixed position in space relative to shaft 2. Inasmuch as ring gear 16 floats, it is free to shift radially in response to possible variations in the forces acting on it until those forces are equalized, and this radial shifting will shift the axis of rotation of sun gear 20. Nevertheless, the axis of rotation of sun gear 20 is determined by ring gear 16, and is thus fixed as regards the gear train 22.

Ring gear 28 of train 22 is mounted to float, and again, this is regardless of whether carrier 26 floats or is definitely located radially. With ring gear 28 free to find its own center, the axis of rotation of sun gear 30 of the next succeeding train 32 is thus determined. Ring gear 38 of train 32 floats, and thus the axis of rotation of shaft 40 is determined. Variations in the thus determined location of the axis of rotation of shaft 40 are accommodated by the flexible coupling 42.

Thus, in a power train consisting of a plurality of gear sets connected in series as in Fig. 1, only one element of one of the gear sets need be mounted on bearings. The rest of the gears of the entire power train are free to shift their centers or axes of rotation in response to variations in forces transmitted by and to the gears because of imperfections of manufacture, and the like. The axes of rotation shift, as will be understood by those skilled in the art, until the causative forces become equalized. Moreover, this equalization of forces is accomplished in a gear train which does not require the close tolerances that would be necessary to get even approximately equal loading in a gear train not embodying the floating principle.

Referring now to the embodiment shown in Figs. 2 and 3, and more particularly to the more schematic Fig. 2, the advantages of the floating characteristics in the gear trains consisting of gear sets 104, 108 and 104', 108' will be understood from the foregoing discussion of Fig. 1 and need not be discussed here in great detail. It will suffice here to point out merely that sun gear 96 rotates about an axis which is fixed in space by one or more bearings, such as that indicated schematically at 94. Gears 98 and ring gear 105 can be mounted to float. With ring gear 105 floating, it is free to find its own center, and the center thus located determines the axis of rotation of ring gear 107 relative to planetary gear set 108. Accordingly, the ring gear 107 of planetary gear set 108 is fixed (as defined above) and planet gears 110 and sun gear 114 can be mounted to float. Thus the only bearing required for the entire power train consisting of gear 90 and planet sets 104 and 108 is the bearing indicated schematically at 94. As pointed out above, this may be one or more bearings, as the particular design dictates.

Further reference is made to Fig. 2 for a discussion of the additional features of the invention there shown. There are two features inherent in this embodiment of the invention, one of these being the feature of steering the vehicle, and the other being the feature of torque multiplication.

The steering feature will be discussed first. Let it be assumed to begin with that the vehicle is proceeding in a straight-ahead direction. For this condition of operation, brakes 78 and 80 are engaged and clutches 70 and 72 are disengaged. Cross shaft 68 is a constantly rotating shaft because of the straight-through connection with main clutch 46. Moreover, for a given engine speed, cross shaft 68 rotates at a constant speed regardless of the operating position of transmission 48.

With the brakes 78 and 80 applied, and the vehicle in motion, bull gears 90 and 92 are necessarily stationary. Inasmuch as carriers 100 and 100' are permanently held against rotation in the embodiment shown, the ring gears and their corresponding connections 106 and 106' are stationary. Wheels 120 and 122 are then driven through planetary gear sets 108 and 108', gear sets 104 and 104' operating simply as reduction gears as will be understood by those skilled in the art.

Let it now be assumed that the vehicle is moving to the right as seen in Fig. 2 and is to be steered toward the upper edge of the drawing as there shown. The operator manipulates the controls so as to disengage brake 78 and engage clutch 70. Clutch 72 and brake 80 remain unaffected.

Constantly rotating shaft 68 now drives the rotatable shaft 74, rotating gear 82 and driving bull gear 90. Bull gear 90 drives sun gear 96 and, because carrier 100 is held against rotation, ring gear 105 rotates.

In a preferred embodiment of the invention, the gear ratios are such that ring gear 105 rotates "backwards," resulting in slowing down the drive wheel 120. Inasmuch as drive wheel 122 continues to rotate at its same speed, drive wheel 122 runs faster than wheel 120, and the vehicle steers toward the upper edge of the drawing as seen in Fig. 2.

It will be seen from the foregoing that the steering speed is automatically adjusted or regulated by the speed of the vehicle. If the transmission 48 is engaged in a "low" gear, the speed differential between wheels 120 and 122 will be much greater than when transmission 48 is engaged in "high" gear, because shaft 50 does not change its speed with changes in the operating engagement of transmission 48. Thus, in low gear, the vehicle turns about a much shorter radius than in high gear.

It will of course be understood by those skilled in the art that the various gear ratios may be so designed as to drive the wheel 120 backwards, or hold it stationary, if desired. In a preferred embodiment of the invention, the ratios are selected so as to turn wheel 120 very slowly, with brake 78 completely released and clutch 70 completely engaged, and with change speed gear device 48 engaged in low gear.

Moreover, the controls (not shown) for brakes 78, 80 and clutches 70, 72 need not necessarily operate to completely release the brakes and completely lock the clutches. If the brakes are either "on" or "off," and the clutches are either completely disengaged or locked, then the vehicle will have a theoretically definite steering radius for each operating position of the transmission 48—the qualification "theoretically" being desirable because of such variables as tire slip. However, if a brake is only partially engaged or its corresponding clutch is allowed to "slip," the steering radius will be increased somewhat, and in that manner, an infinite number of steering radii is possible between a minimum radius and straight ahead.

Referring further to Fig. 2, the torque multiplication features of the invention will now be discussed. With the vehicle moving in the forward direction and straight ahead, brakes 78 and 80 are disengaged and clutches 70 and 72 are simultaneously engaged. With ring gears 107 and 107' both running backwards, and with the transmission 48 in low gear, the gear ratios are so selected as to drive the ring gears 107 and 107' backwards at a speed almost but not quite fast enough to stop the forward motion of wheels 120 and 122. Thus there is a tremendous torque multiplication through the gear sets 104, 108 and 104', 108'.

Conversely, with the vehicle moving in reverse, inasmuch as shaft 50 does not change direction, simultaneous release of brakes 78 and 80 and engagement of clutches 70 and 72 serves to speed up the motion of the vehicle, as will be understood by those skilled in the art. In operating in this manner, there are of course added gear losses, and a consequent small reduction in efficiency.

It will be seen from the foregoing that this invention provides a gear train which requires a minimum of close alignment of the gears, making for longer lasting gear trains which can be built at considerably less expense. In its application to a vehicle as shown, the invention provides highly desirable steering characteristics and torque multiplication. Other advantages will be apparent to those skilled in the art.

What is claimed is:

1. A power train comprising: a radially located hollow shaft; a gear set having a sun element mounted on the hollow shaft for rotation therewith, a floating ring element, and a third element having at least one gear meshing with the gears of the sun and ring elements; means to hold one of the aforesaid elements against rotation; a planetary gear set having a floating sun element, a ring element, and a planet element, the planet element comprising a planet carrier and at least one planetary gear on the carrier, the planetary gear meshing with the gears of the sun and ring elements; means directly connecting the floating ring element of the first-named gear set with the ring element of said planetary gear set; a second shaft extending through the hollow shaft and on which the second-named sun element is mounted; and vehicle drive means connected to be driven by the planet carrier.

2. In a vehicle axle carrying a vehicle drive wheel: a hollow shaft; bearing means rotatably supporting the hollow shaft; a sun gear carried by the hollow shaft and rotatable therewith; a floating ring gear; a third gear rotatably mounted on a fixed basis between and meshing with the sun and ring gears; a planetary gear set having a floating sun element, a ring element, and a planet element, the planet element comprising a planet carrier and at least one planetary gear on the carrier, the planetary gear meshing with the gears of the sun and ring elements; drive means connecting the floating ring gear and the ring element to fix the ring element axis according to the location of the axis of the ring gear; a drive shaft passing through the hollow shaft and drivingly connected with the floating sun element; and means connecting the planet element to drive the vehicle drive wheel.

3. A power train comprising: an input member and an output member; a three-element gear set having a ring gear element, a central gear element, and a carrier element supporting at least one intermediate gear meshing with the ring and central gears; a second three-element gear set having a ring gear element, a central gear element, and a carrier element supporting at least one intermediate gear meshing with the ring and central gears; means to hold one element of each gear set against rotation about the axis of its central gear; means connecting another element of the first gear set with the input member; means radially locating at least one element and not more than two elements of the first gear set, whereby at least one remaining element of the first gear set is free to float; means connecting a floated element of the first gear set with an element of the second gear set to drive the same about an axis radially located by the connected floated element, whereby at least one remaining element of the second gear set is free to float; and drive means connecting a floated element of the second gear set with the output member and including a flexible connection which permits radial movement of the floated element relative to the output member.

4. A power train comprising: a plurality of adjacent three-element gear sets each having a ring gear element, a central gear element, and a carrier element supporting at least one intermediate gear meshing with the ring and central gears of the set; means to locate radially at least one element and not more than two elements of one of the end gear sets, whereby at least one remaining element of the set is free to float; means connecting a floated element of said end set with one element of the next adjacent set whereby said one element is located radially by the connected floated element of the end set; means locating radially at least one element and not more than two elements of each set other than said one end gear set, whereby at least one remaining element of each said set is free to float; means connecting a floated element of each set other than said one end gear set with one element of the next adjacent said set whereby said one element is located radially by the connected element of the next preceding set; means holding one element of each gear set against rotation about the axis of its central gear; an input member connected to one element of the aforesaid one end gear set; an output member; and drive means connecting a floated member of the other one of the end gear sets with the output member and including means to permit radial movement of the floated member relative to the output member.

References Cited in the file of this patent

UNITED STATES PATENTS

| | | |
|---|---|---|
| 1,257,462 | Dean | Feb. 26, 1918 |
| 1,641,656 | Barnett | Sept. 6, 1927 |
| 2,357,561 | Tatlow | Sept. 5, 1944 |
| 2,467,226 | Place | Apr. 12, 1949 |
| 2,488,660 | Conkle | Nov. 22, 1949 |
| 2,529,330 | Double | Nov. 7, 1950 |

UNITED STATES PATENT OFFICE
CERTIFICATE OF CORRECTION

Patent No. 2,950,634                                          August 30, 1960

Ralph B. Clark et al.

It is hereby certified that error appears in the printed specification of the above numbered patent requiring correction and that the said Letters Patent should read as corrected below.

Column 3, line 7, after "indicated" insert -- schematically --; column 6, line 30, for "basis" read -- axis --; column 8, list of references cited, under the heading UNITED STATES PATENTS, add the following:

| | | |
|---|---|---|
| 2,027,655 | Stoeckicht --------------- Jan. | 14, 1936 |
| 2,372,226 | Robin et al. ------------- Mar. | 27, 1945 |
| 2,543,811 | Snow et al. -------------- Mar. | 6, 1951 |
| 2,689,488 | Storer et al. ----------- Sept. | 21, 1954 |
| 2,689,489 | Storer et al. ----------- Sept. | 21, 1954 |
| 2,684,591 | Lundquist --------------- July | 27, 1954 |
| 2,700,311 | Bade -------------------- Jan. | 25, 1955 |

Signed and sealed this 18th day of April 1961.

(SEAL)
Attest:

ERNEST W. SWIDER
Attesting Officer

DAVID L. LADD
Commissioner of Patents